US007022228B2

(12) United States Patent
Hennes et al.

(10) Patent No.: US 7,022,228 B2
(45) Date of Patent: Apr. 4, 2006

(54) FILTER DEVICE

(75) Inventors: Stefan Hennes, Neunkirchen (DE); Michael Sakraschinsky, St. Ingbert (DE); Patrik Maurer, Sulzbach (DE); Norbert Sann, Riegelsberg (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 0 days.

(21) Appl. No.: 10/480,102

(22) PCT Filed: Aug. 2, 2002

(86) PCT No.: PCT/EP02/08605

§ 371 (c)(1),
(2), (4) Date: Dec. 9, 2003

(87) PCT Pub. No.: WO03/020398

PCT Pub. Date: Mar. 13, 2003

(65) Prior Publication Data

US 2004/0149640 A1 Aug. 5, 2004

(30) Foreign Application Priority Data

Aug. 31, 2001 (DE) ................................ 101 42 774

(51) Int. Cl.
*B01D 27/00* (2006.01)
*B01D 27/08* (2006.01)
*B01D 35/30* (2006.01)

(52) U.S. Cl. .................... 210/232; 210/444; 210/493.2

(58) Field of Classification Search ................ 210/232, 210/457, 493.2, 440, 444
See application file for complete search history.

(56) References Cited

U.S. PATENT DOCUMENTS 3,070,232 A * 12/1962 Casaleggi .................... 210/90
5,643,448 A 7/1997 Martin et al.
6,139,739 A 10/2000 Hamlin et al.
6,770,110 B1 * 8/2004 Seifert et al. ................. 55/498

FOREIGN PATENT DOCUMENTS

| | | |
|---|---|---|
| DE | 195 23 239 A 1 | 1/1996 |
| EP | 1 093 840 A2 | 4/2001 |
| EP | 0 891 214 B1 | 5/2001 |
| GB | 841603 A | 7/1960 |
| WO | 00/21640 * | 4/2000 |
| WO | 00/62893 * | 10/2000 |

* cited by examiner

*Primary Examiner*—Thomas M. Lithgow
(74) *Attorney, Agent, or Firm*—Roylance, Abrams, Berdo & Goodman, L.L.P.

(57) ABSTRACT

A filter device includes a pot-shaped filter housing (1) that defines a longitudinal axis along which a filter element (13) can be inserted into and removed form the filter housing (1). A retaining device detachably retains the filter element (13) in the filter housing (1) and has first and second retaining elements on the inner side of the filter housing (1) and on the filter element (13) and interacting with one another. At least one set of the retaining elements has a shape coaxial to the longitudinal axis of the filter housing (1) and forms at least a part of a thread. When the filter element (13) is rotated about its longitudinal axis, it is locked in a form-fit.

8 Claims, 4 Drawing Sheets

FILTER DEVICE

FIELD OF THE INVENTION

The present invention relates to a filter device with a cup-shaped filter housing defining a longitudinal axis, along which a filter element can be inserted into the filter housing and can be removed from it. A retaining means is used for detachable fixing of the filter element in the filter housing, has first and second retaining elements which interact with one another and are provided on the inside of the filter housing and on the filter element.

BACKGROUND OF THE INVENTION

Filter devices with filter housings and replaceable filter elements are known. A not insignificant portion of production costs arise in these filter devices for the construction of the retaining means for detachable fixing of the filter element. In the filter device of this type disclosed in EP 0 819 214 B1, the retaining means has a spring arrangement of two compression springs which work against one another. By the resulting spring force of the two springs, an end piece, located on the filter element and acting as a sealing and retaining element is slipped onto the housing-side retaining element which is formed by the connecting piece. The connecting piece extends into the support tube of the filter element on the head of the filter housing.

The comparatively complex construction of the retaining means leads to high production costs.

SUMMARY OF THE INVENTION

Objects of the present invention are to provide a filter device with a filter housing and a replaceable filter element characterized by simple construction of the retaining means for the filter element and by the corresponding low production costs.

In a filter device of this type, these objects are basically achieved in the present invention by at least one of the retaining elements having a shape which forms at least part of a thread and which is concentric to the longitudinal axis of the filter housing. The filter element, after turning around its longitudinal axis, is fixed by an interlocking connection.

A retaining means acts in the manner of a screwed connection. The filter element is fixed in the retaining means and is interlocked by turning. This arrangement can be implemented with simple structure so that in the desired manner economical production is possible. Since, by turning the filter element, an interlocked connection between the filter element and the filter housing is produced, the additional advantages of ease of operation and high operating reliability are achieved.

Preferably, first retaining elements form a guide for the second retaining elements when the filter element is rotated. The guide has a thread pitch which is referenced to the longitudinal axis on at least part of its length.

The second retaining elements can be cams which project transversely to the longitudinal axis of the filter housing and are guided in cam paths. The cam paths form the first retaining elements and have a thread pitch on at least part of their path length. This arrangement permits prompt fixing in a simple manner. The connection can be made self-locking by the thread pitch. While maintaining the advantages of an otherwise conventional screw connection in this area, the indicated connection can be produced and broken again within a short time with little expenditure of force. In addition, the alignment of the connection is largely unambiguous, i.e., the installation situation of the interchangeable filter element relative to the filter housing can be easily reproduced.

Preferably, cams are on the inside of the filter housing and cam paths are on the filter element.

The filter element can be a filter cartridge having a fluid-permeable support tube surrounded by filter material and an end cap bordering the edge of the filter material. The end cap located on the filter element bottom-side end assigned to the bottom of the cup-shaped filter housing can have the cam paths on its periphery.

In these embodiments, the production of the filter device is especially simple and economical if the cams are made on the inside of a ring body mounted in the cup-shaped filter housing in its bottom area.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
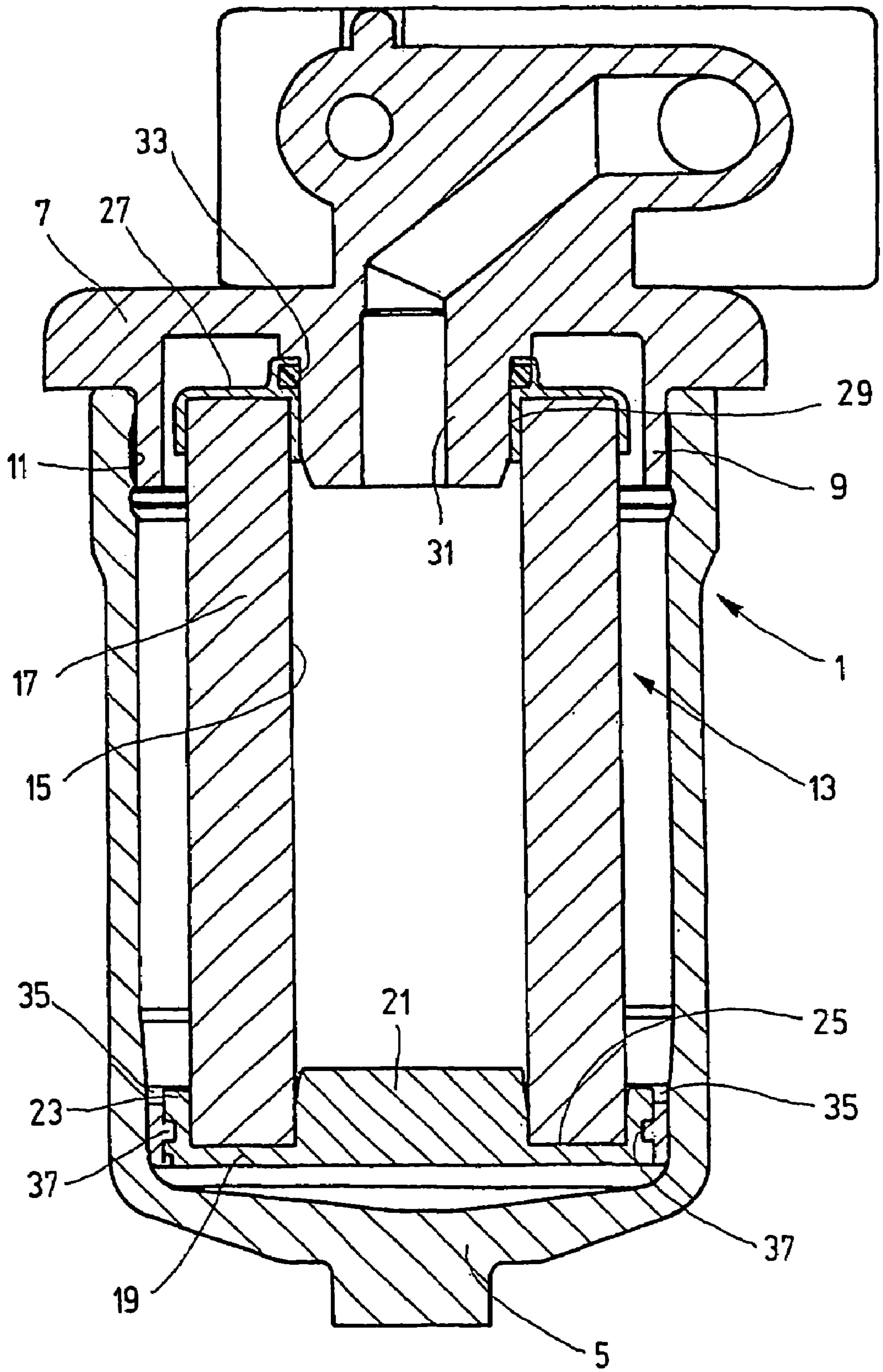
FIG. 1 is a side elevational view in section of one embodiment of the filter device according to the present invention, with a filter cartridge located in the filter housing, which section is shown schematically simplified.
Figure 2:
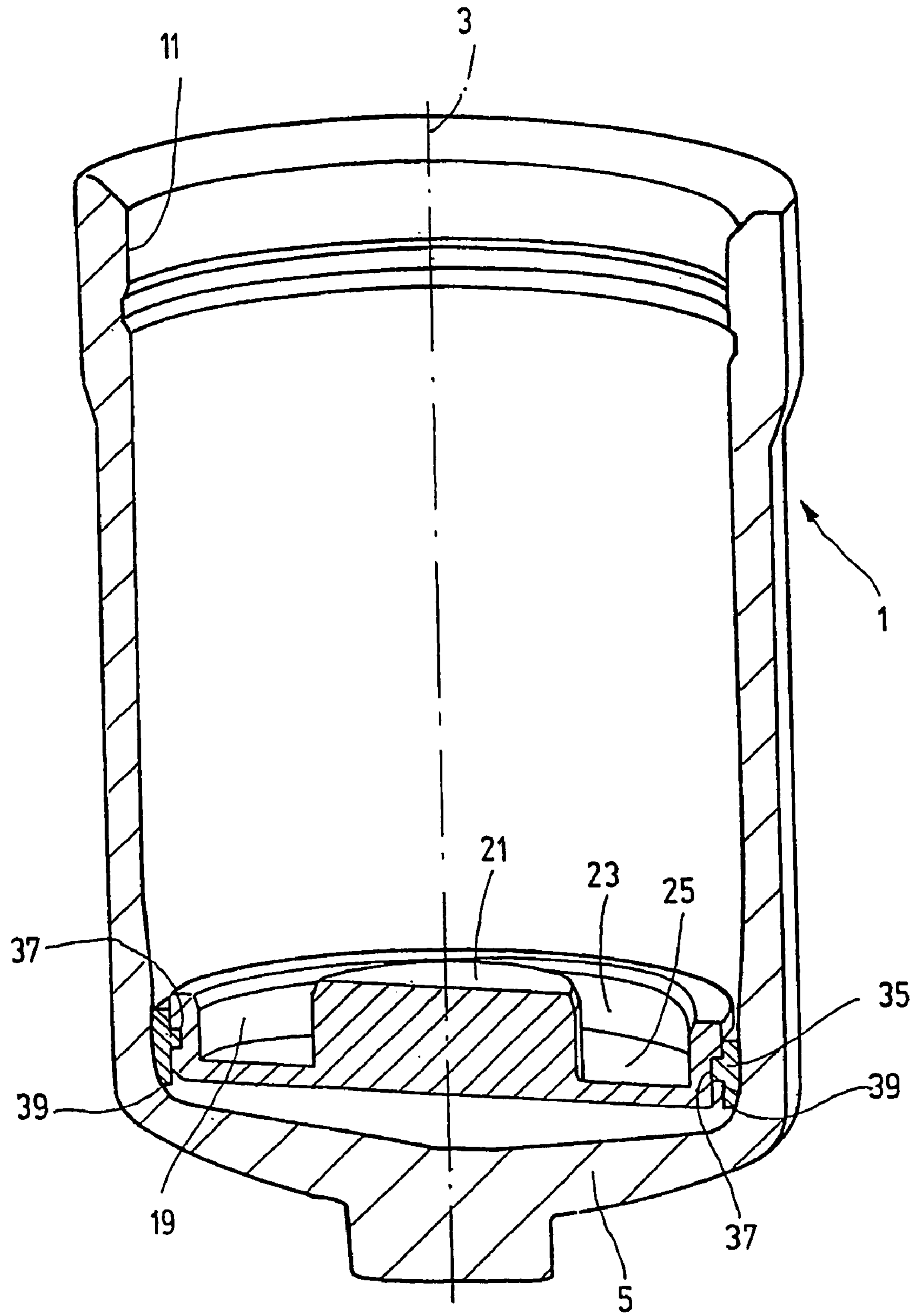
FIG. 2 is a perspective view in section of only the cup-shaped part of the filter housing of the embodiment of FIG. 1, without the housing cover, only one bottom-side end cap of the filter cartridge, which is not otherwise shown, being fixed by interlocking in the filter housing.

As shown in FIGS. 1 and 2, the illustrated and described preferred embodiment of the filter device has a filter housing 1 in the form of a cup which is rotationally-symmetrical in its outline relative to the longitudinal axis 3. The housing has a closed bottom 5, and a housing cover 7 which seals the opposing housing top end and as shown only in FIG. 1. The housing cover 7 has, on a sleeve-shaped projection 9, an outside thread which can be screwed to the inside thread 11 on the top end of the cup-shaped part of the filter housing 1. Sealing elements for sealing between the housing cover 7 and the cup-shaped part of the filter housing 1 are not shown in the schematic from FIG. 1.

Figure 3:
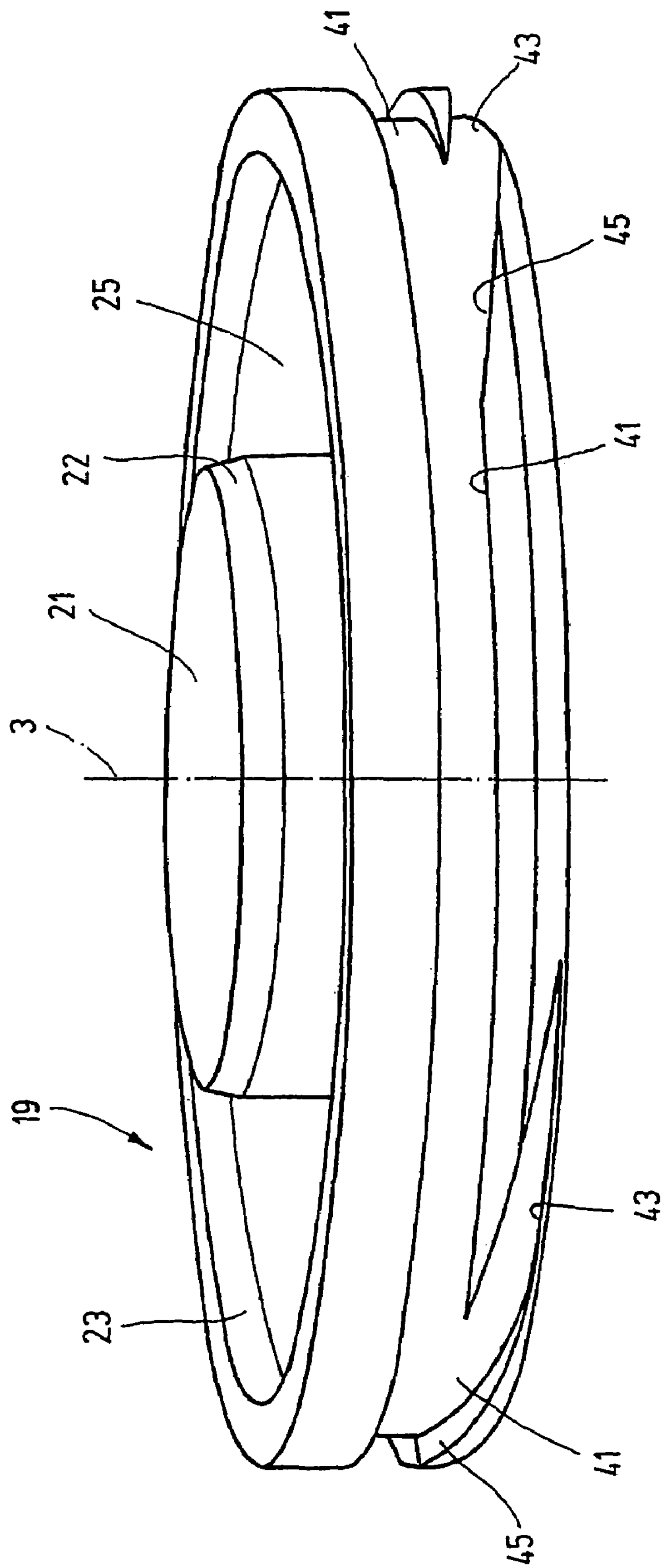
FIG. 3 is an enlarged perspective view of the end cap of the filter cartridge of FIGS. 1 and 2.

A filter cartridge 13 is concentric to the longitudinal axis 3 and can be held in the filter housing 1. Conventionally, the filter cartridge has an inner, fluid-permeable support tube 15 surrounded by filter material 17. On the bottom-side end facing the bottom 5 of the filter housing 1, the filter cartridge 13 is closed by an end cap 19. The end cap forms a border for the facing lower end edge area of the filter material 17. For this purpose, the end cap 19 has a central, circular cylindrical journal 21 extending into the interior of the support tube 15 of the filter cartridge 13. On its free end edge, journal 21 has a slight bevel 22 (FIG. 3). Between the outside of the journal 21 and the radially outer peripheral jacket 23 of the end cap, an annular groove-like recess 25 receives the lower edge of the filter material 17.

The filter cartridge 13 on the opposing top end has a top head cap 27 which borders the filter material 17 and the edge of the support tube 15 and which forms a connecting sleeve 29. When the housing cover 7 is screwed onto the cup-shaped part of the filter housing 1, a connecting piece 31, which forms an outlet for the filtered fluid, engages the connecting sleeve 29 to produce the fluid connection to the interior of the support tube 15. An O ring 33 on the connecting sleeve 29 seals the interior of the filter cartridge (the clean side of the filter device) against the space of the filter housing 1 surrounding the filter cartridge 13 (the fouled side of the filter device). The inlet for the fluid to be filtered into the filter housing 1 is not shown in the figures.

Figure 4:
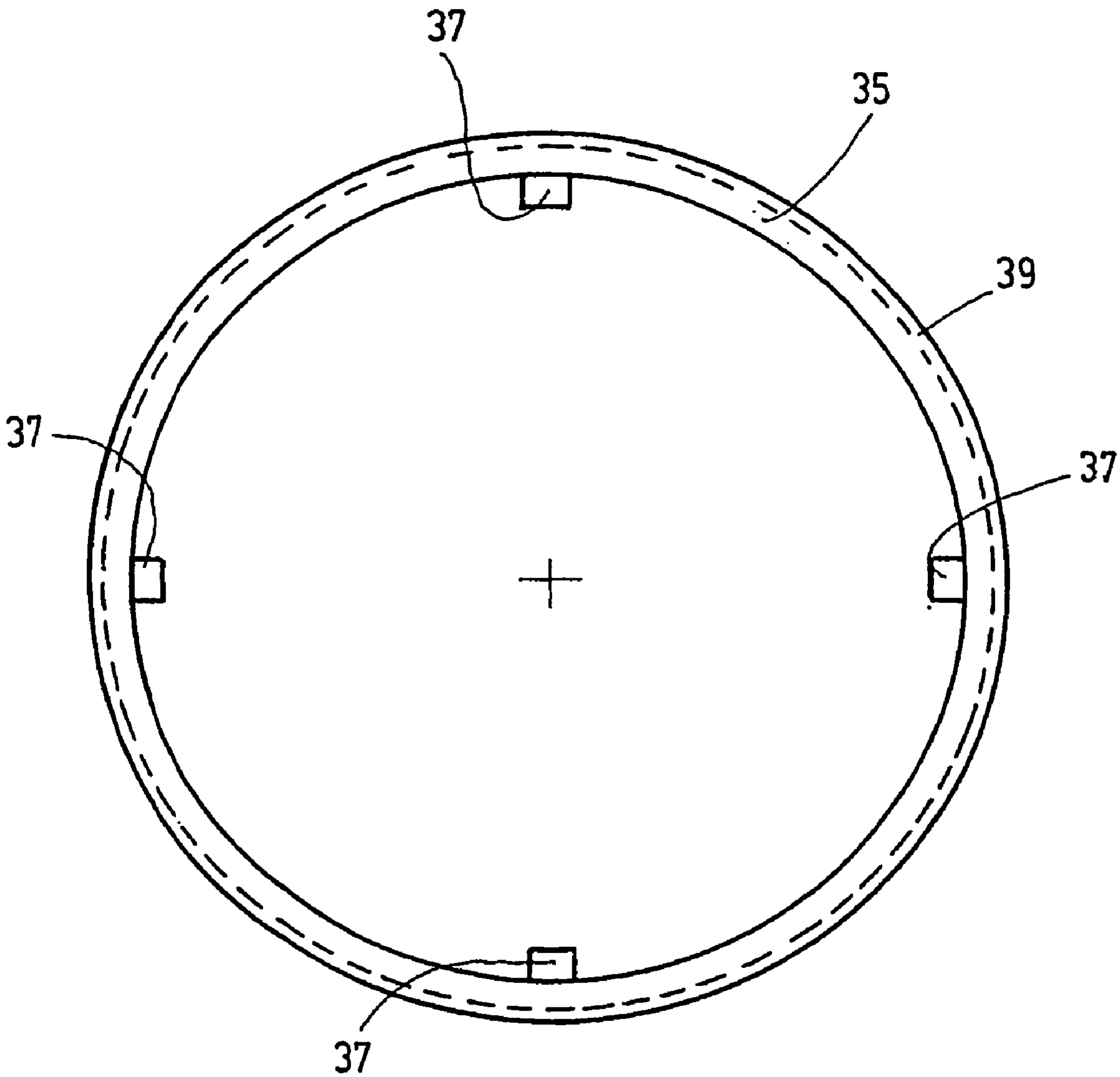
FIG. 4 is a top plan view of a ring body attached in the bottom-side end area of the filter housing according to an embodiment of the present invention, with cams used as retaining elements and projecting inwardly.

The configuration of the retaining means for detachably fixing or retaining the filter cartridge 13 in the filter housing 1 is especially shown in FIGS. 2 to 4. The retaining means has first retaining elements which are associated with the filter cartridge 13, and second retaining element which are associated with the filter housing 1. The retaining elements which are associated with the filter cartridge 13 are located on the end cap 19. The retaining elements which are associated with the housing 1 are located on a ring body 35 mounted in the filter housing 1 in the vicinity of its bottom 5 and shown separately in FIG. 4. As is apparent from FIG. 4, the ring body 35 on its inner jacket or peripheral surface has four journal-like cams 37. Cams 37 project radially to the inside and are arranged offset to one another by 90°. On the end edge facing the bottom 5 of the filter housing 1, the ring body 35 on the peripheral side has a slight rounding 39 with which the ring body 35 is matched to the slight arch of the inside wall of the filter housing 1 in the bottom area. As already indicated, the ring body 35 in the filter housing 1 is attached by pressing or welding in.

The radially projecting cams 37 of the ring body 35 are designed to engage the cam paths 41 (see FIG. 3) formed as the retaining elements of the filter cartridge 13 on its end cap on the outer peripheral side. These cam paths 41 are formed by recesses which are machined into the periphery of the jacket 23. As the guide for each cam 37, one cam path 41 is provided for each cam 37 so that there are four cam paths 41. Each of these cam paths 41 forms a groove which is open on the lower end edge of the jacket 23 of the end cap 19. These open areas 43 of the grooves are offset by 90° each to one another, so that when the filter cartridge 13 is inserted into the filter housing 1, the cams 37 mounted on the housing side can move into the open areas 43. These open areas 43 adjoin areas 45 with a thread-like pitch for each cam path 43. If the filter cartridge 13 is turned or rotated around the longitudinal axis 3 after the cams 37 move into the open areas 43 of the cam paths 41, the cams 37 run over pass through the pitch areas 45, i.e., the cam ramps which are formed thereby. In this manner, a holding force acting in the axial direction is produced on the end cap 19 of the filter cartridge 13, by interlocking engagement between the cams 37 and the cam paths 41. The locking of the filter cartridge 13 created in this way by turning around the longitudinal axis 3 in one direction of rotation can be easily released by turning the filter cartridge 13 in the opposite direction of rotation in order to remove the filter element again from the filter housing 1. As is best illustrated in FIG. 3, the cam paths 41, following their starting area 45, have pitch transitions extending into a groove which extends along the entire periphery of the jacket 23 of the end cap 19. The end cap 19 in the illustrated and described embodiment can be advantageously press-formed from a plastic material. The edge of the filter material 17 held in the recess 25 within the jacket 23 of the end cap 19 can be cemented to the end cap 19. The journal 21 of the end cap projecting into the interior of the support tube 15 of the filter cartridge 13 can likewise be cemented to the support tube 15.

Instead of using four cams 37 and four associated cam paths 41, a different number of cams and cam paths can be used. Preferably, no fewer than three cams and cam paths are used. Instead of the configuration shown in which for the cam paths 41 the ramp-like area 45 which has the pitch adjoins an area without a pitch, there can be cam paths 41 with a continuous pitch. Instead of the configuration of the retaining elements shown in the illustrated embodiment as individual cams 37, there could be a threaded connection between the end cap 19 and the filter housing 1 by means of continuous thread elements in the manner of a screw connection with an inside thread and/or outside thread elements which are made peripherally continuous.

While one embodiment has been chosen to illustrate the invention, it will be understood by those skilled in the art that various changes and modifications can be made therein without departing from the scope of the invention as defined in the appended claims.

What is claimed is:

1. A filter device, comprising:

a cup-shaped filter housing defining a longitudinal axis;

a filter element insertable into and removable from said filter housing along said longitudinal axis; and retaining means detachably securing said filter element in said filter housing and including first and second retaining elements which interact with one another, one of said first and second retaining elements being on one of an inner surface said filter housing and an outer surface said filter element, the other of said first and second retaining elements being on the other of said inner surface of said filter housing and said outer surface of said filter element, each of said first retaining elements being a guide groove concentric to said longitudinal axis having a first portion opening and extending substantially parallel to said longitudinal axis and a second portion extending from said first portion, having a thread pitch relative to said longitudinal axis and defining a cam path, each of said second portions being defined between substantially parallel and opposed wall surfaces extending helically about said longitudinal axis, each of said second retaining elements being a cam extending transversely to said longitudinal axis and received in the respective guide groove when said filter element is received in said filter housing;

whereby said filter element is moved axially into said filter housing as said cams enter said first portions, and is rotated about said longitudinal axis causing said cams to enter said second portions as said filter element moves axially and rotationally simultaneously to form an interlocking connection between said filter element and said filter housing.

2. A filter device according to claim 1 wherein said cams are on said inside surface of said filter housing; and said guide grooves are on said outside surface of said filter element.

3. A filter device according to claim 2 wherein said filter element comprises a filter cartridge having a fluid-permeable support tube, having filter material surrounding said support tube and having an end cap encompassing a bottom edge of said filter material, said end cap having said guide grooves on a periphery thereof.

4. A filter device according to claim 3 wherein said cams comprise journals projecting radially inwardly of said inside surface of said filter housing in a common plane, and are angularly offset relative to one another by a definable angle.

5. A filter device according to claim 4 wherein four of said cams are relatively offset by 90 degrees relative to one another and respectively interact with four of said guide grooves.

6. A filter device according to claim 4 wherein said guide grooves are angularly offset relative to one another by a definable angle on said end cap, and open on a lower edge of said end cap permitting said cams to enter said guide grooves when said filter element is inserted into said filter housing.

7. A filter device according to claim 6 wherein said guide grooves are offset by 90 degrees relative to one another on four peripheral areas of said end cap.

8. A filter device according to claim 2 wherein said cams are formed on an inside surface of ring body, said ring body being mounted on a bottom area of said filter housing.

* * * * *